United States Patent
Gokan

(10) Patent No.: US 6,746,288 B2
(45) Date of Patent: Jun. 8, 2004

(54) PERSONAL WATERCRAFT HAVING INTERNAL COMBUSTION ENGINE WITH SUPERCHARGER INCORPORATED THEREIN

(75) Inventor: Yoshitsugu Gokan, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 50 days.

(21) Appl. No.: 10/167,467

(22) Filed: Jun. 13, 2002

(65) Prior Publication Data

US 2003/0013361 A1 Jan. 16, 2003

(30) Foreign Application Priority Data

Jul. 13, 2001 (JP) ........................... 2001-213496

(51) Int. Cl.[7] .............................................. B63H 21/10
(52) U.S. Cl. ................... 440/88 F; 440/88 R
(58) Field of Search .................. 440/88 R, 88 A, 440/88 M, 88 HE, 89 R, 88 D

(56) References Cited

U.S. PATENT DOCUMENTS 4,827,722 A * 5/1989 Torigai ........................ 60/599
5,752,863 A * 5/1998 Baker et al. .................. 440/38
5,788,547 A * 8/1998 Ozawa et al. ............. 440/89 R

FOREIGN PATENT DOCUMENTS

JP  2001146197 A  5/2001

* cited by examiner

Primary Examiner—Ed Swinehart
(74) Attorney, Agent, or Firm—Birch, Stewart, Kolasch & Birch, LLP

(57) ABSTRACT

To utilize a small space in a vessel body efficiently and simultaneously augment the output power and realize a suitable water supply structure to an intercooler. A surge tank and an intercooler are provided between a supercharger and an internal combustion engine incorporated in the inside of a vessel body. The intercooler is disposed just below the surge tank, and an intake entrance from the supercharger and an exit to the surge tank are provided above the intercooler. A jet pump and the intercooler are in communication with each other directly by a cooling water hose, and cooling water is supplied from the intake entrance side into the intercooler.

14 Claims, 10 Drawing Sheets

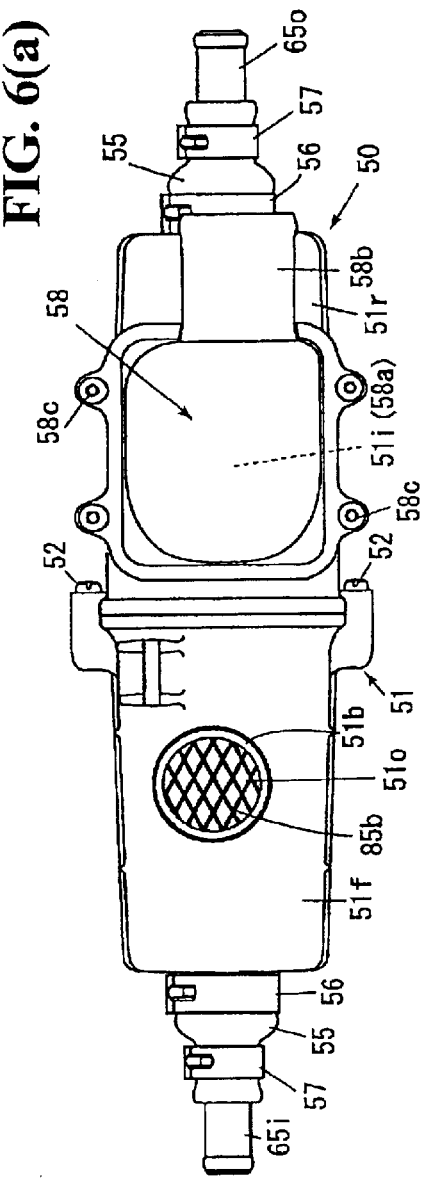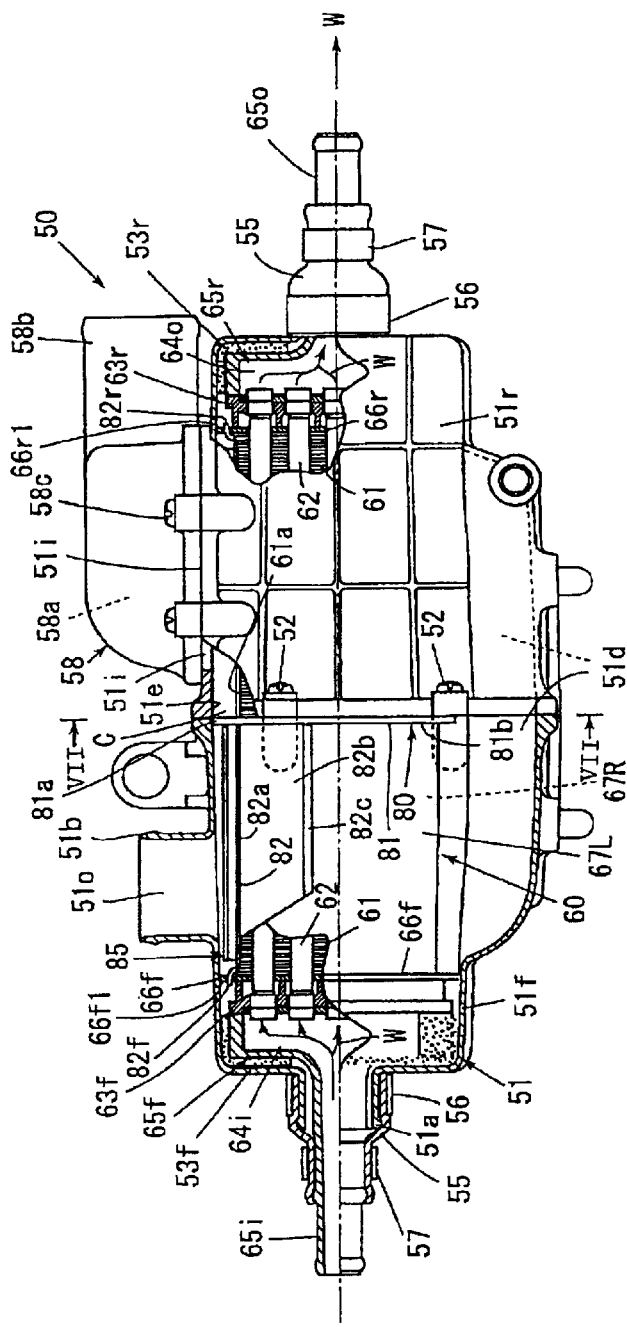

PERSONAL WATERCRAFT HAVING INTERNAL COMBUSTION ENGINE WITH SUPERCHARGER INCORPORATED THEREIN

CROSS-REFERENCE TO RELATED APPLICATIONS

This non-provisional application claims priority under 35 U.S.C. § 119(a) on Patent Application No. 2001-213496 filed in Japan on Jul. 13, 2001, the entirety of which is hereby incorporated by reference.

BACKGROUND OF THE INVENTION

1. Field of the Invention

This invention relates to a small sliding boat or personal watercraft (PWC) as they are more generally known, having an internal combustion engine with a supercharger incorporated therein. More particularly, the present invention relates to the arrangement of an intercooler and a cooling water passage of a personal watercraft of the type mentioned.

2. Description of Background Art

The power source in widespread personal watercrafts is conventionally a 2-cycle engine. However, it has been examined to use a 4-cycle engine for the power source in order to cope with reduction of pollution in recent years.

However, the output power of a 4-cycle engine is lower than that of a 2-cycle engine of the same total stroke volume. Accordingly, an engine with a supercharger and an intercooler have been examined in order to make up the power difference. The assignee of the present application has proposed a personal watercraft in Japanese Patent Laid-Open No. 2001-146197. In the above document, an internal combustion engine (engine) with a supercharger and an intercooler incorporated therein has been disclosed.

In this personal watercraft, a 4-cycle engine 2 with a supercharger 3 is incorporated in the inside of a body 1 as shown in FIGS. 9 and 10 of the present invention. A surge tank 4 and an intercooler 5, which communicate with an exhaust port of the engine, are provided between the supercharger 3 and the engine 2.

If it is attempted to dispose the surge tank 4 and the intercooler 5 between the supercharger 3 and the engine 2 in such a personal watercraft as described above, it is difficult to ensure the space for incorporation of the surge tank 4 and the intercooler 5 in a small space of the body 1. In particular, the space for incorporation of the intercooler 5 and the space for the layout of pipes for the intercooler 5 and surge tank 4 is insufficient. In the conventional personal watercraft shown in FIGS. 9 and 10, the intercooler 5 is disposed rearwardly downwardly of the surge tank 4.

Therefore, in the conventional personal watercraft, a comparatively great space S appears below the surge tank 4. Accordingly, there is a problem in that the small and precious space of the body is liable to suffer from insufficient use. Simultaneously, the space S is used to lay out the pipe 6 from the intercooler 5 to the surge tank 4. Accordingly, the lengthening of the pipe cannot be avoided. Furthermore, intake air cooled in the intercooler 5 is liable to be heated to a higher temperature in the process while it passes the pipe 6. Therefore, there is a problem also in that the cooling effect of the intake air is reduced by a temperature rise to decrease the intensity of the intake air, resulting in a drop of output power of the engine.

Furthermore, with the personal watercraft according to the background art, a water supply structure for the intercooler 5 is uncertain.

SUMMARY OF THE INVENTION

An object of the present invention resides in solutions to the problems described above to provide a personal watercraft having an internal combustion engine with a supercharger incorporated therein, wherein the small and precious space in the body can be utilized efficiently, and simultaneously the output power can be augmented.

Another object of the present invention resides in the provision of a personal watercraft having an internal combustion engine with a supercharger incorporated therein which has a suitable water supply structure for an intercooler.

In order to attain the object described above, according to a first aspect of the present invention, a personal watercraft having an internal combustion engine with a supercharger incorporated therein is incorporated in the inside of a body composed of a hull and a deck. A surge tank and an intercooler, which communicate with an intake port of the internal combustion engine, are provided between the supercharger and the internal combustion engine. Furthermore, the intercooler is disposed just below the surge tank.

According to a second aspect of the present invention, the personal watercraft having an internal combustion engine with a supercharger incorporated therein according to the first aspect of the present invention includes the intercooler having an intake entrance from the supercharger and an exit to the surge tank at an upper portion thereof. The intake entrance is provided adjacent the supercharger disposed on one side of the internal combustion engine, while the exit is provided adjacent the other end of the internal combustion engine.

According to a third aspect of the present invention, a personal watercraft having an internal combustion engine with a supercharger incorporated therein includes a water cooled intercooler disposed in an intake system of the internal combustion engine. The personal watercraft has a cooling water passage for taking in cooling water to be supplied to the intercooler from the outside of the personal watercraft and supplying the cooling water to the intercooler.

According to a fourth aspect of the present invention, the personal watercraft having an internal combustion engine with a supercharger incorporated therein according to the third aspect of the present invention includes the cooling water passage, which communicates a jet pump for propelling the personal watercraft and the intercooler with each other.

According to a fifth aspect of the present invention, the personal watercraft having an internal combustion engine with a supercharger incorporated therein according to either of the third or fourth aspects of the present invention includes the cooling water passage, which communicates a jet pump for propelling the personal watercraft and the intercooler directly with each other.

According to a sixth aspect of the present invention, the personal watercraft having an internal combustion engine with a supercharger incorporated therein according to the third through fifth aspects of the present invention includes the intercooler, which has an intake entrance from the supercharger and an exit to the surge tank. The cooling water is supplied from the intake entrance side into the intercooler.

With the personal watercraft having an internal combustion engine with a supercharger incorporated therein according to the first aspect of the present invention, the internal combustion engine with the supercharger is incorporated in the inside of the body formed from the hull and the deck. Furthermore, the surge tank and the intercooler, which are in communication with the intake port of the internal combustion engine, are provided between the supercharger and the internal combustion engine. In addition, the intercooler is disposed just below the surge tank. Accordingly, the space below the surge tank can be utilized efficiently. As a result, the small and precious space in the body can be utilized efficiently.

Simultaneously, the intercooler is disposed just below the surge tank. Accordingly, the pipe from the intercooler to the surge tank can be formed to a minimum length. Accordingly, the temperature rise of intake air while the intake air passes the pipe can be reduced. As a result, the cooling effect of intake air (intake air density) can be augmented to augment the output power of the internal combustion engine.

With the personal watercraft having an internal combustion engine with a supercharger incorporated therein according to the second aspect of the present invention, the intercooler has, at an upper portion thereof, the intake entrance from the supercharger and the exit to the surge tank. The intake entrance is provided adjacent the supercharger disposed on one side of the internal combustion engine, while the exit is provided adjacent the other side of the internal combustion engine. Accordingly, in addition to the above advantages of the first aspect of the present invention, the supercharger, intercooler and surge tank can be connected to each other by short pipes.

In addition, the intake entrance of the intercooler and the supercharger can be connected to each other making use of the connection space (space formed between the surge tank and the intercooler below the surge tank) between the exit of the intercooler and the surge tank positioned just above the intercooler. Accordingly, the small and precious space in the body can be utilized further efficiently.

With the personal watercraft having an internal combustion engine with a supercharger incorporated therein according to the third aspect of the present invention, the personal watercraft includes the water-cooled intercooler disposed in the intake system of the internal combustion engine and the cooling water passage for taking in cooling water to be supplied to the intercooler from the outside of the personal watercraft and supplying the cooling water to the intercooler. Therefore, the intercooler is cooled with water of a low temperature taken in from the outside of the personal watercraft. Accordingly, the necessity for any other heat exchanger for cooling the intercooler is eliminated.

With the personal watercraft having an internal combustion engine with a supercharger incorporated therein according to the fourth aspect of the present invention, the cooling water passage communicates the jet pump for propelling the personal watercraft and the intercooler with each other. Therefore, the supply of cooling water to the intercooler is performed from the jet pump through the cooling water passage. Accordingly, in addition to the above advantages of the third aspect of the present invention, the necessity for any other pump for supplying cooling water to the intercooler is eliminated.

With the personal watercraft having an internal combustion engine with a supercharger incorporated therein according to the fifth aspect of the present invention, the cooling water passage communicates the jet pump for propelling the personal watercraft and the intercooler directly with each other. Therefore, the intercooler is cooled directly without any other cooled member (for example, the internal combustion engine) with cooling water from the jet pump. Accordingly, in addition to the above advantages of the third and fourth aspects of the present invention, the density of intake air and the output power of the internal combustion engine are further augmented.

With the personal watercraft having an internal combustion engine with a supercharger incorporated therein according to the sixth aspect of the present invention, the intercooler has the intake entrance from the supercharger and the exit to the surge tank and the cooling water is supplied from the intake entrance side into the intercooler. Therefore, the intake entrance side at which the temperature is higher in the intercooler is cooled efficiently. Accordingly, in addition to the above advantages of the third through fifth aspects of the present invention, the cooling effect of intake air by the entire intercooler and the output power of the internal combustion engine are further augmented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6(*a*) is a plan view illustrating an intercooler 50;

FIG. 6(*b*) is a front elevational view partly cut away illustrating the intercooler 50 of FIG. 6(*a*);

FIG. 7(*b*) is a sectional view taken along line VII—VII of FIG. 6(*b*) illustrating the intercooler 50 of FIG. 7(*a*);

FIG. 8(*b*) is a front elevational view illustrating the plate 80 of FIG. 8(*a*);

FIG. 8(*c*) is a left side elevational view illustrating the plate 80 of FIG. 8(*a*);

DETAILED DESCRIPTION OF THE PREFERRED EMBODIMENTS

The present invention will now be described with reference to the accompanying drawings.

Figure 1:
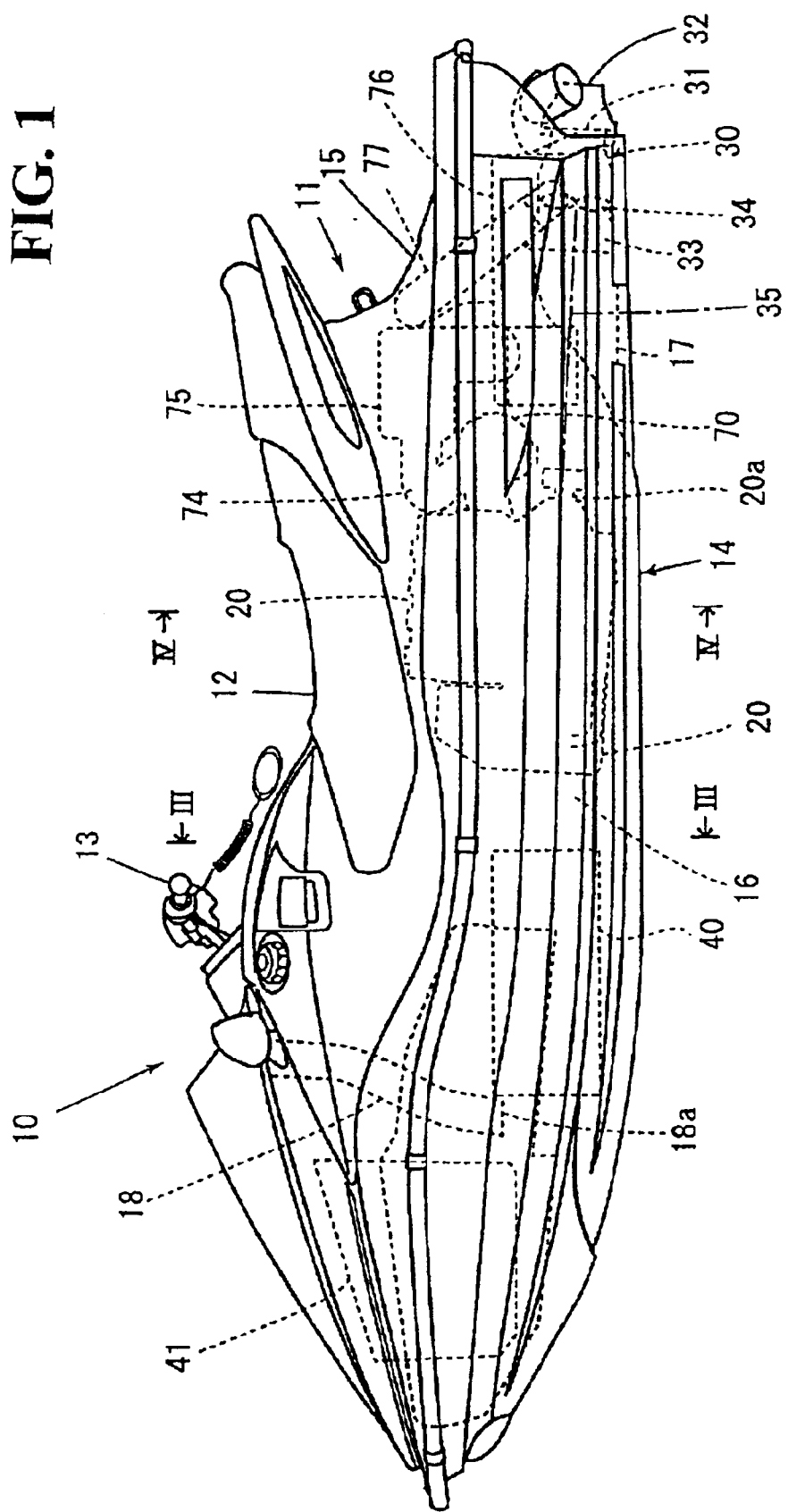
FIG. 1 is a schematic side elevational view illustrating an embodiment of a personal watercraft having an internal combustion engine with a supercharger incorporated therein according to the present invention.
Figure 2:
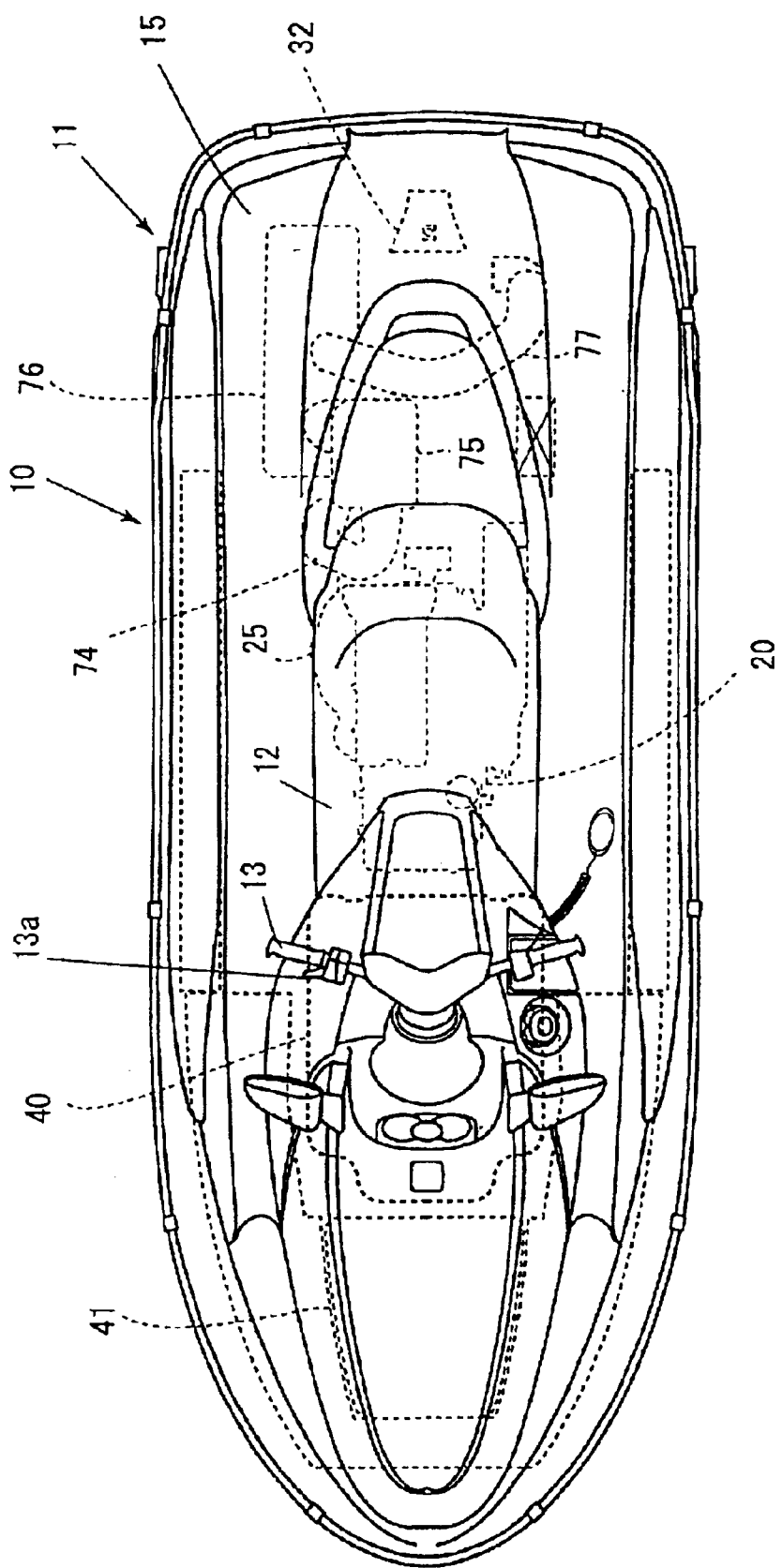
FIG. 2 is a plan view of the personal watercraft in FIG. 1.
Figure 3:
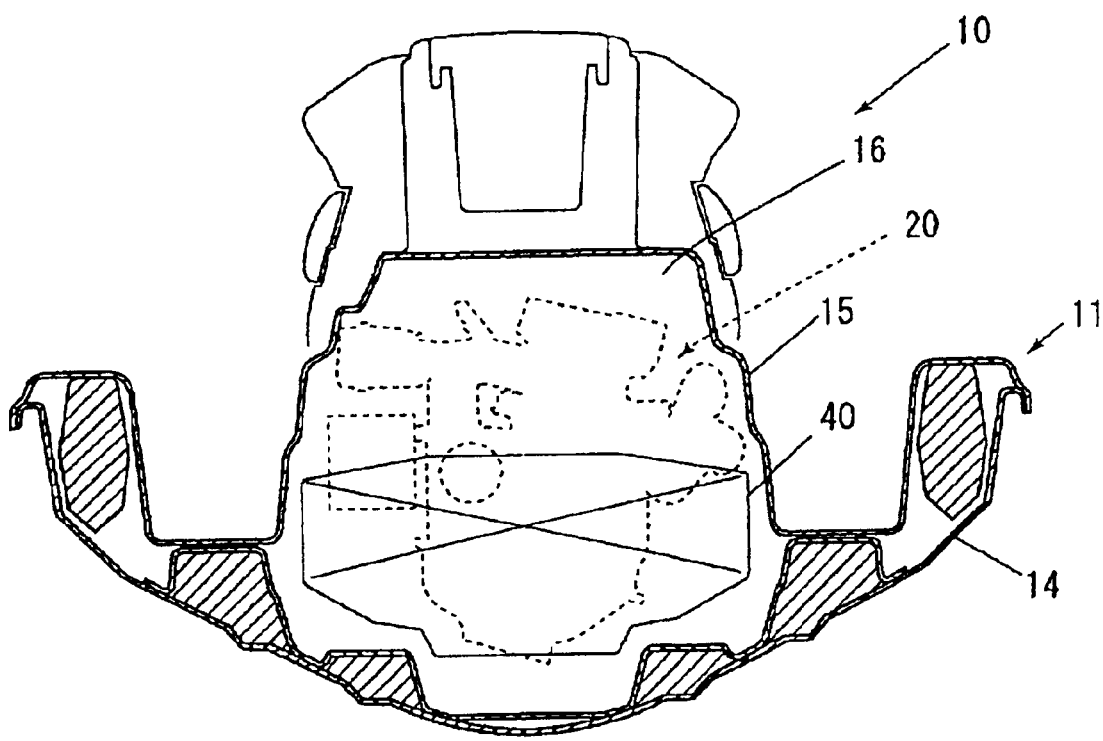
FIG. 3 is a partial enlarged sectional view (partly omitted sectional view) taken along line III—III of FIG. 1.

FIG. 1 is a schematic side elevational view illustrating an embodiment of a personal watercraft having an internal combustion engine with a supercharger incorporated therein according to the present invention; FIG. 2 is a plan view therof, and FIG. 3 is a partial enlarged sectional view (partly omitted sectional view) taken along line III—III of FIG. 1.

As shown in the figures (principally in FIG. 1), this personal watercraft 10 of the present embodiment is a small vessel of the saddle type. A driver can sit on a seat 12 supported on a body 11 and grip a steering handle 13 with a throttle lever to steer the personal watercraft 10.

The body 11 has a floating body structure wherein a hull 14 and a deck 15 are joined together such that a space 16 is formed in the inside thereof. In the space 16, an engine (internal combustion engine) 20 is mounted on the hull 14. A jet pump 30, which acts as propulsion means, is driven by the engine 20 and is provided at a rear portion of the hull 14.

The jet pump 30 has a passage 33 extending from an intake 17 open to the bottom to a jet outlet 31 and a nozzle 32 open to the rear end of the body and an impeller 34 disposed in the passage 33. A shaft 35 of the impeller 34 is connected to an output power shaft 20a of the engine 20. Accordingly, if the impeller 34 is driven to rotate by the engine 20, then water taken in from the intake 17 is jetted from the nozzle 32 through the jet outlet 31 so that the body 11 is propelled. The driving speed of the engine 20, that is, the propelling force by the jet pump 30, is operated by a pivoting operation of a throttle lever 13a (refer to FIG. 2) of the steering handle 13 described above. The nozzle 32 is operatively associated with the steering handle 13 by an operation wire (not shown) such that it is pivoted by an operation of the steering handle 13, and the advancing direction can be changed thereby.

It is to be noted that reference numeral 40 denotes a fuel tank, and 41 an accommodation chamber.

Figure 4:
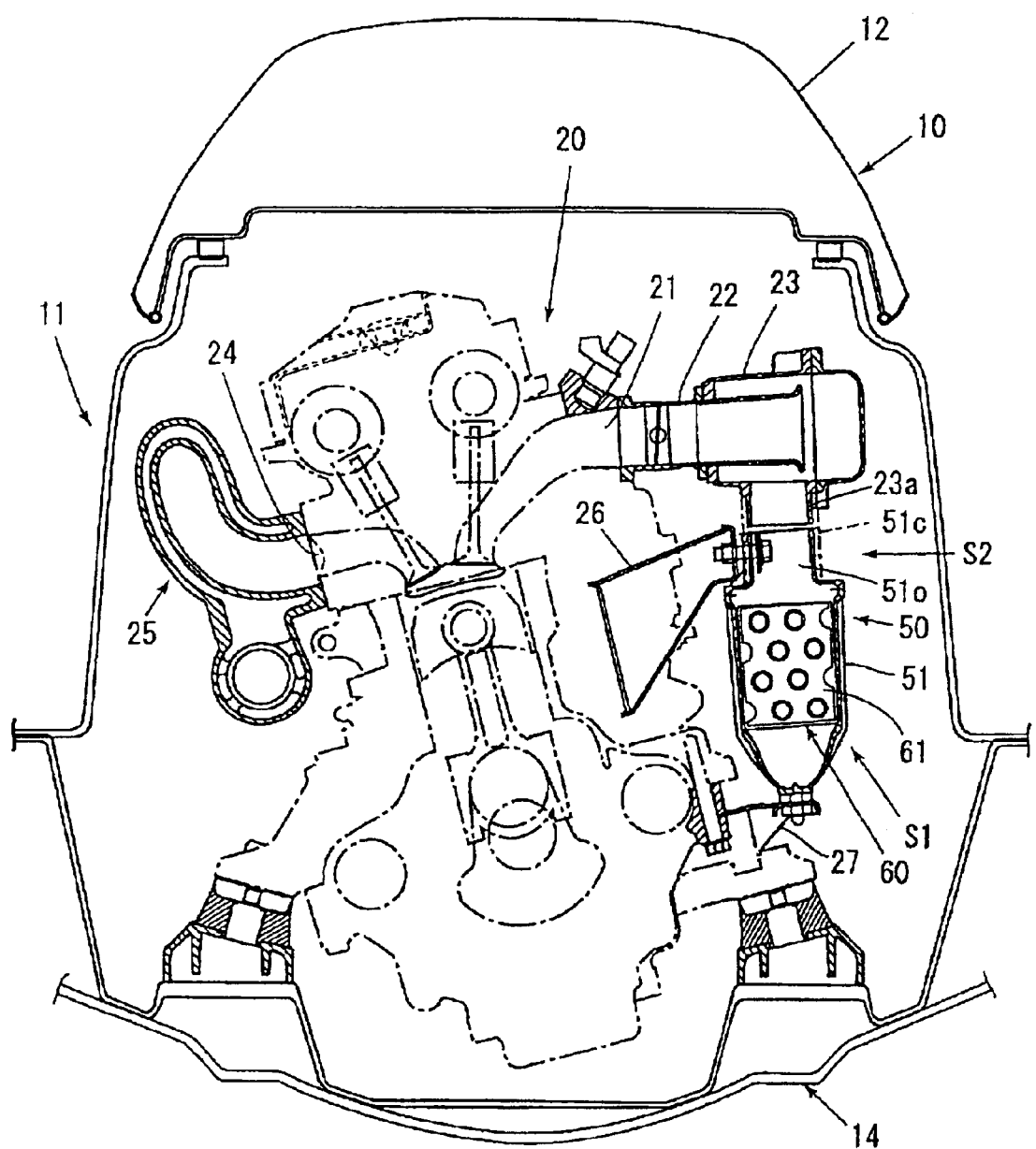
FIG. 4 is a view principally illustrating an engine 20 and is a partial enlarged sectional view (partly omitted sectional view) taken along line IV—IV of FIG. 1.
Figure 5:
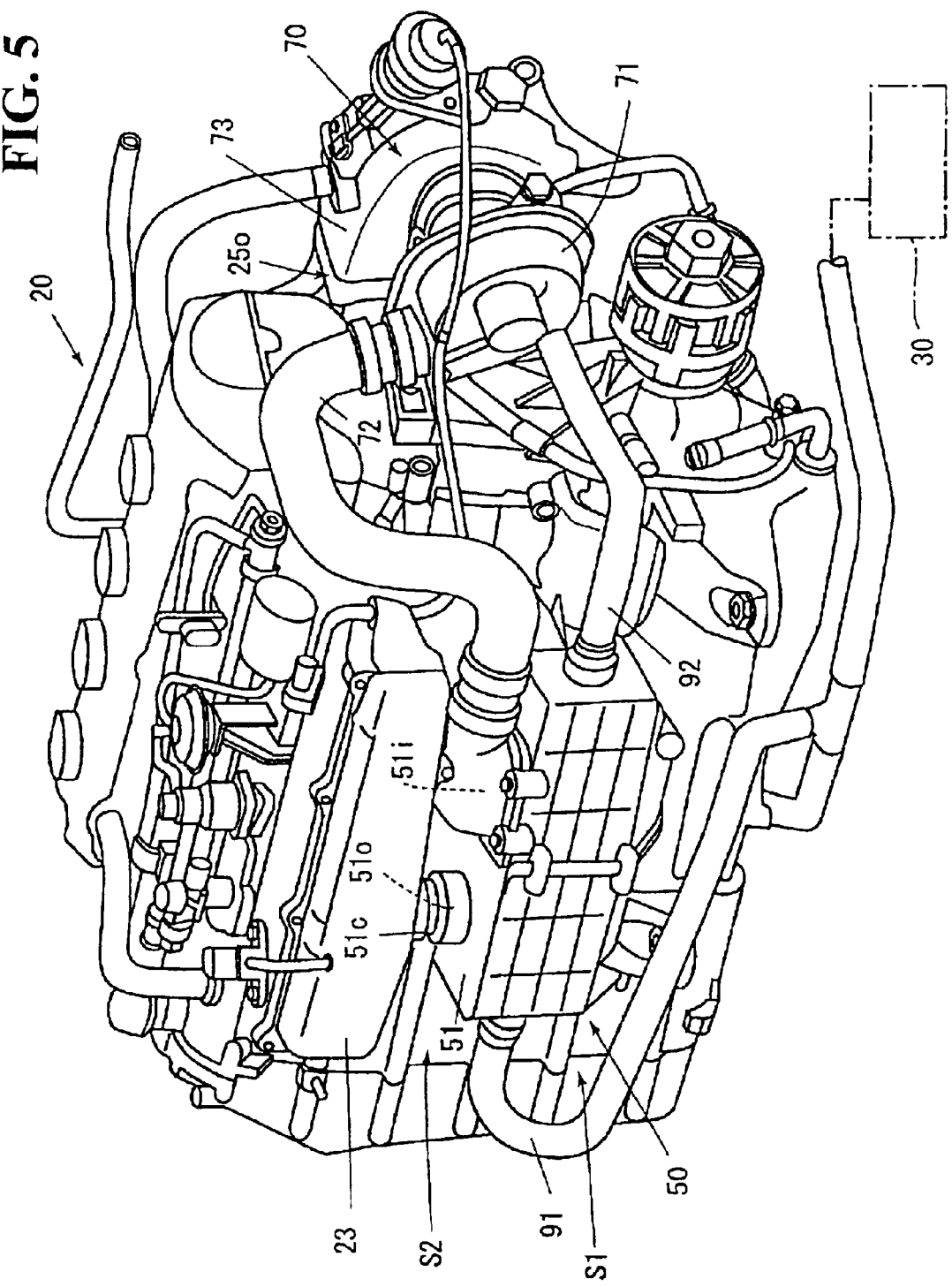
FIG. 5 is a schematic rearward perspective view of the engine 20 viewed obliquely.

FIG. 4 is a view principally showing the engine 20 and is a partial enlarged sectional view (partly omitted sectional view) taken along line IV—IV of FIG. 1. FIG. 5 is a schematic rearward perspective view of the engine 20 viewed obliquely.

The engine 20 is a DOHC in-line four-cylinder 4-cycle engine and is disposed such that the crankshaft (refer to the output power shaft 20a) thereof extends in the forward and backward direction of the body 11 as shown in FIG. 1.

As shown in FIG. 4, an intake opening (intake port) 21 is disposed on the left side (right side in FIG. 4) of the engine 20 with respect to the advancing direction of the body 11. An exhaust opening (exhaust port) 24 is disposed on the right side (left side in FIG. 4) of the engine 20.

An intake duct 22 and a surge tank (intake chamber) 23 are connected to the intake port 21. An intercooler 50 is connected to and disposed just below the surge tank 23. Reference numerals 26 and 27 each denote a mounting bracket of the intercooler 50 to the engine 20.

The intercooler 50 includes a case 51 having an intake entrance 51i connected to and in communication with a compressor section 71 of a supercharger (turbocharger) 70 disposed directly rearwardly of the engine 20 by a pipe 72. The case 51 also includes an exit 51o to the surge tank 23 (described hereinabove as shown also in FIG. 5) as hereinafter described in detail. A cooling unit 60 (refer to FIG. 4) which is a heat exchanging unit is accommodated in the case 51.

Referring to FIG. 5, reference numerals 91 and 92 each denote a cooling water hose connected to the intercooler 50.

An exhaust manifold 25 is provided for the exhaust port 24 of the engine 20 as shown in FIG. 4. An exhaust exit 25o (refer to FIG. 5) of the exhaust manifold 25 is connected to a turbine section 73 (refer to FIG. 5) of the turbocharger 70.

It should be noted that exhaust gas which has rotated a turbine in the turbine section 73 passes through the pipe 74, a backflow preventing chamber 75 for preventing a backflow of water (admission of water into the turbocharger 70 and so forth) upon capsize, a water muffler 76 and a pipe 77. The exhaust gas is then exhausted into a water stream produced by the jet pump 30.

Figure 7A:
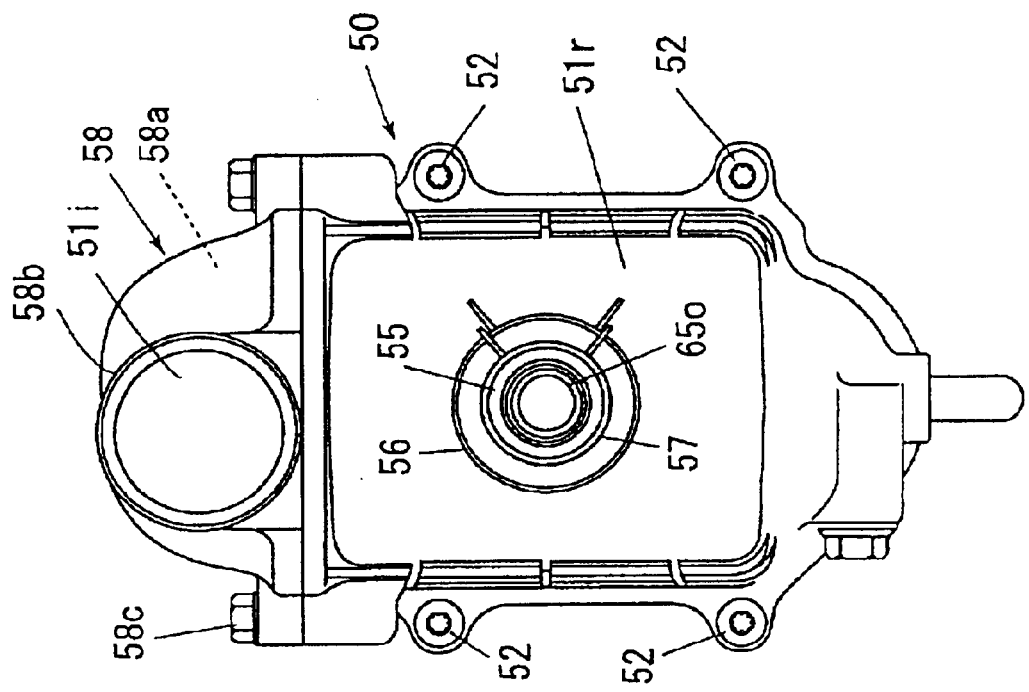
FIG. 7(*a*) is a right side view illustrating the intercooler 50 of FIG. 6(*a*)
Figure 7B:
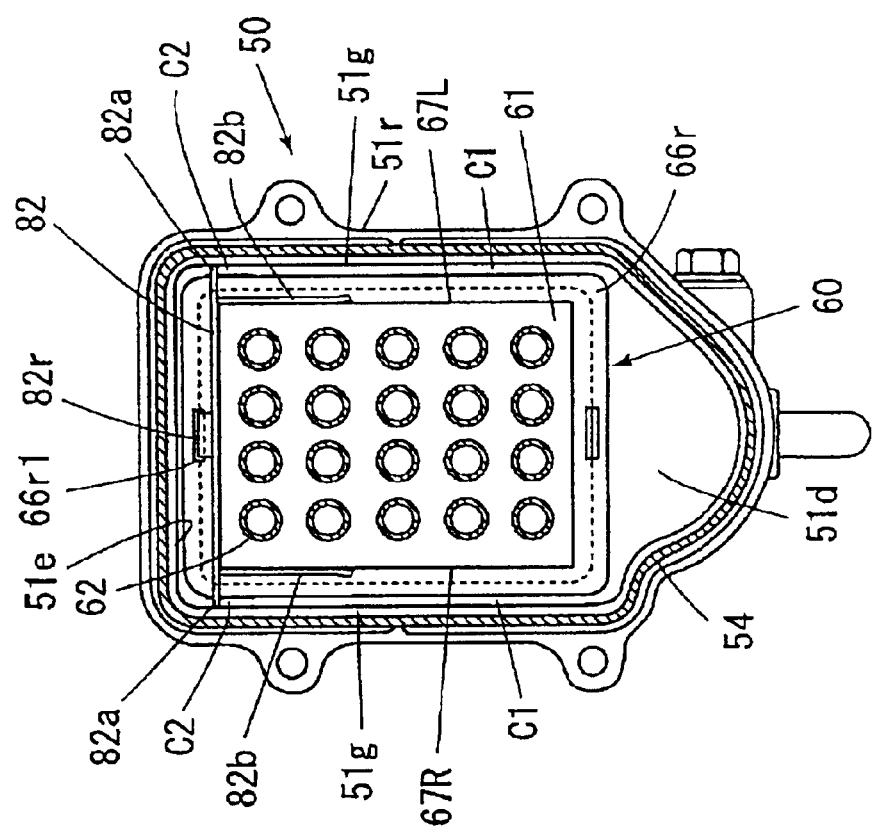

FIG. 6(a) is a plan view illustrating the intercooler 50. FIG. 6(b) is a front elevational view partly cut away illustrating the intercooler 50 of FIG. 6(a). FIG. 7(a) is a right side elevational view and FIG. 7(b) is a sectional view taken along line B—B of FIG. 6(b).

As shown in the above figures, and as described hereinabove, the intercooler 50 includes a case 51 having an intake entrance 51i in communiction with the supercharger (turbocharger) 70 of the engine 20 and an exit 51o in communiction with the surge tank 23. The cooling unit 60 is accommodated in the case 51. The intake entrance 51i and the exit 51o are formed at an upper portion of the case 51.

Furthermore, as is also apparent from FIG. 5, the intake entrance 51i is provided adjacent the supercharger 70 (in this instance, rather rearwardly) and the exit 51o is provided adjacent an opposite side (in this instance, rather forwardly).

More particularly, the cooling unit 60 is formed as a separate member from the case 51, and the cooling unit 60 is accommodated in the case 51 to form the intercooler 50.

The cooling unit 60 includes a plurality of heat exchanging fins 61 disposed in a layered relationship at a fixed pitch in the forward and backward direction (leftward and rightward direction in FIG. 6(a)). A plurality of water pipes 62 extend in the forward and backward direction through the heat exchanging fins 61 and have outer circumferential faces welded to the heat exchanging fins 61. Front and rear support plates 63f and 63r support the water pipes 62 at the front and the rear. A front member 65f is disposed forwardly of the front support plate 63f and cooperates with the front support plate 63f to form a lead-in chamber (or discharge chamber as hereinafter described) 64i for cooling water W. The front member 65f also forms an inlet pipe (or discharge pipe as hereinafter described) 65i for the cooling water. A rear member 65r is disposed rearwardly of the rear support plate 63r and cooperates with the rear support plate 63r to form a discharge chamber (or lead-in chamber as hereinafter described) 64o for the cooling water W. The rear member 65r also forms a discharge pipe (or lead-in pipe as hereinafter described) 65o for the cooling water. An isolation plate 66f is disposed forwardly of the group of the heat exchanging fins 61 and is welded to the outer circumferential faces of the water pipes 62 for completely isolating the lead-in chamber 64i for water and the group of the heat exchanging fins 61 from each other. Another isolation plate 66r is disposed rearwardly of the group of the heat exchanging fins 61 and is welded to the outer circumferential faces of the water pipes 62 for completely isolating the discharge chamber 64o for water and the group of the heat exchanging fins 61 from each other. The cooling unit also includes side plates 67L and 67R (refer to FIG. 7(b)) which cover the left and right (the front side and the rear side of the plane of FIG. 6(b)) of the group of the heat exchanging fins 61 between the isolation plates 66f and 66r. Front and rear edges of the side plates 67L and 67R are welded to the isolation plates 66f and 66r. Inner faces of the side plates 67L and 67R are welded to side edges of the heat exchanging fins 61. Furthermore, the front support plate 63f and the front member 65f are welded into a unitary member, and the rear support plate 63r and the rear member 65r are welded into a unitary member.

The inlet pipe 65i for cooling water is connected to a cooling water intake of the jet pump 30 through a cooling water hose 91 (refer to FIG. 5) which serves as a cooling water passage. The discharge pipe 65o is connected to an outlet (not shown) of the water muffler 77 through a water jacket (not shown) of the turbocharger 70 and so forth.

Accordingly, in the embodiment shown, cooling water W from the jet pump 30 flows from the inlet pipe 65i through the lead-in chamber 64i into and in the water pipes 62. In this process, the cooling water W cools the water pipes 62 and the group of the heat exchanging fins 61. The cooling water W then flows from the discharge chamber 64o through the discharge pipe 65o, the cooling water hose 92, the water jacket of the turbocharger 70 and so forth and is discharged to the water muffler 77.

However, it is also possible to connect the cooling water hoses 91 and 92 reversely. In particular, it is possible to connect the cooling water hose 91, which is connected directly to the cooling water intake of the jet pump 30, to the discharge pipe 65o so as to serve as an introduction pipe for the cooling water W so that the cooling water W may be supplied into the intercooler 50 from the intake entrance 51i side. This is effective to augment the cooling effect of intake air as hereinafter described. It is to be noted that, in this instance, the inlet pipe 65i serves as a discharge pipe for the cooling water W. The cooling water hose 92 connected to the inlet pipe 65i may be connected to the turbocharger 70 or the like or may be connected directly to the water muffler 77. Where the cooling water hose 92 is not connected to the turbocharger 70, the turbocharger 70 is cooled using a different cooling water path.

The case 51 is a two-piece case composed of a front case 51f and a rear case 51r. The cooling unit 60 is accommodated in the case 51 such that it is held in a sandwiched manner between the front and rear cases 51f and 51r. The front and rear cases 51f and 51r are coupled to each other by bolts 52. When the cooling unit 60 is accommodated in the case 51, outer peripheral edges of the isolation plates 66f and 66r contact with the inner face of the case 51.

Reference characters 53f and 53r in FIG. 6(b) each denote a cushion member interposed between the inner face of the case 51 and the cooling unit 60. Reference numeral 54 in FIG. 7(b) denotes a gasket interposed between the split faces of the front and rear cases 51f and 51r.

A cylindrical portion 51a, in which the inlet pipe 65i of the cooling unit 60 is fitted, is formed on the front case 51f. A tube 55 is provided such that it spans the cylindrical portion 51a and the inlet pipe 65i. The tube 55 is tightened to the cylindrical portion 51a and the inlet pipe 65i by means of clamps 56 and 57 so that foreign matter may not enter the case 51. This also applies to the coupling structure between the rear case 51r and the discharge pipe 65o of the cooling unit 60.

The intake entrance 51i is formed at an upper face of the rear case 51r. The intake entrance 51i is covered with an intake air lead-in member 58. The intake air lead-in member 58 has an intake air lead-in chamber 58a connecting to the intake entrance 51i above the intake entrance 51i. A pipe portion 58b connects to the intake air lead-in chamber 58a and extends rearwardly. The compressor section 71 of the supercharger (turbocharger) 70 is connected to the pipe portion 58b through the pipe 72 (refer to FIG. 5) described hereinabove. The intake air lead-in member 58 is connected to an upper face of the rear case 51r by four bolts 58c with a gasket (not shown) interposed therebetween.

A pipe portion 51b, which forms the exit 51o for air, is formed on an upper face of the front case 51f. The pipe portion 51b is connected to an intake air lead-in pipe portion 23a (refer to FIG. 4) of the surge tank 23 through a tube 51c (refer to FIGS. 4 and 6).

Communicating passages 51d are formed at lower portions of the rear case 51r and the front case 51f such that they are in communication with each other when the rear case 51r and the front case 51f are coupled to each other (a state shown in FIG. 6).

Accordingly, with the intercooler 50 having such a configuration as described above, air from the compressor section 71 of the supercharger 70 enters downwardly from the intake entrance 51i into the rear case 51r. In the process wherein the air flows downwardly, it contacts with and is cooled by the group of the heat exchanging fins 61 present in the rear case 51r. Then, the air passes through the communicating passages 51d and enters the front case 51f. In the process wherein the air flows upwardly from below, it contacts with and is further cooled by the group of the heat exchanging fins 61 present in the front case 51f. Thereafter, it is supplied from the exit 51o into the surge tank 23.

For example, if no countermeasure is taken for the intercooler having such a basic configuration as described above, then in addition to the original flow path of air, that is, a flow path along which air enters from the intake entrance 51i and contacts with the heat exchanging fins 61 and then goes out from the exit 51o, another flow path (C) along which air passes through a space C between the outer peripheral edges 61a (refer to FIG. 6(b)) of the heat exchanging fins 61 and the inner wall face 51e of the case 51 is formed. Thus, part of the air entering from the intake entrance 51i passes through the space C and goes out from the exit 51o almost without contacting with the heat exchanging fins 61. This gives rise to the heat exchanger effectiveness becoming insufficient.

Therefore, in the intercooler 50 in the present embodiment, a plate 80 which is a separate member from the case 51 and closes the space between the outer peripheral edges 61a of the heat exchanging fins 61 and the inner wall face 51e of the case 51 partly (in the present embodiment, at least at the space C) such that an air flow passage is formed at a location other than the closed portion (that is, at the original flow passage for air).

Figure 8A:
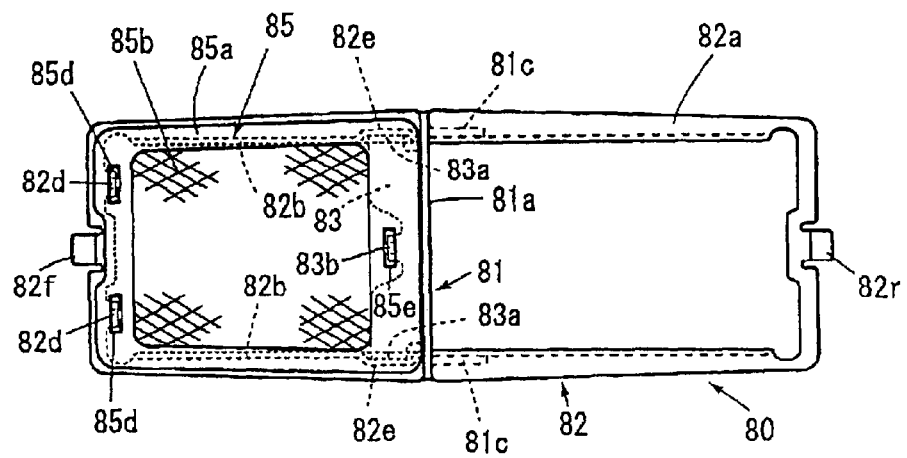
FIG. 8(*a*) is a plan view illustrating a plate 80.
Figure 8B:
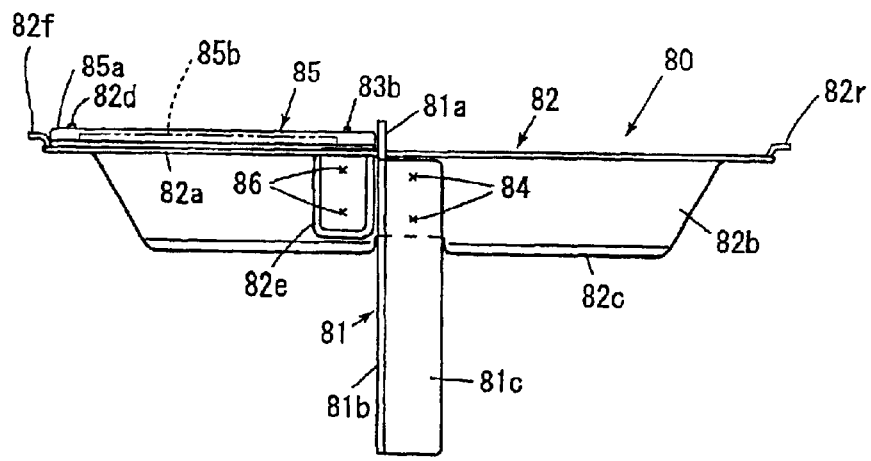

FIG. 8(a) is a plan view illustrating the plate 80; FIG. 8(b) is a front elevational view of the plate 80; and FIG. 8(c) is a left side elevational view of the plate 80.

The plate 80 is made of aluminum and basically is a plate of a substantially T-shape as viewed in front elevation formed by welding a first plate 81 and a second plate 82 to each other.

Figure 8C:
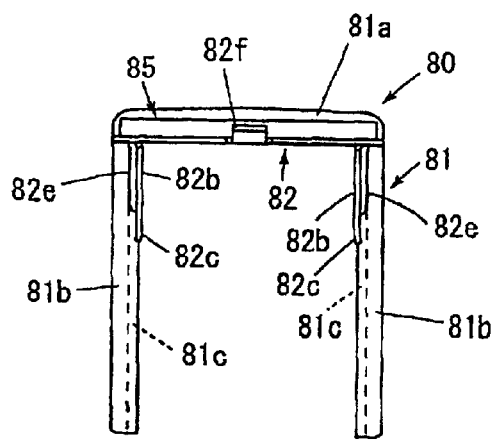
Figure 9:
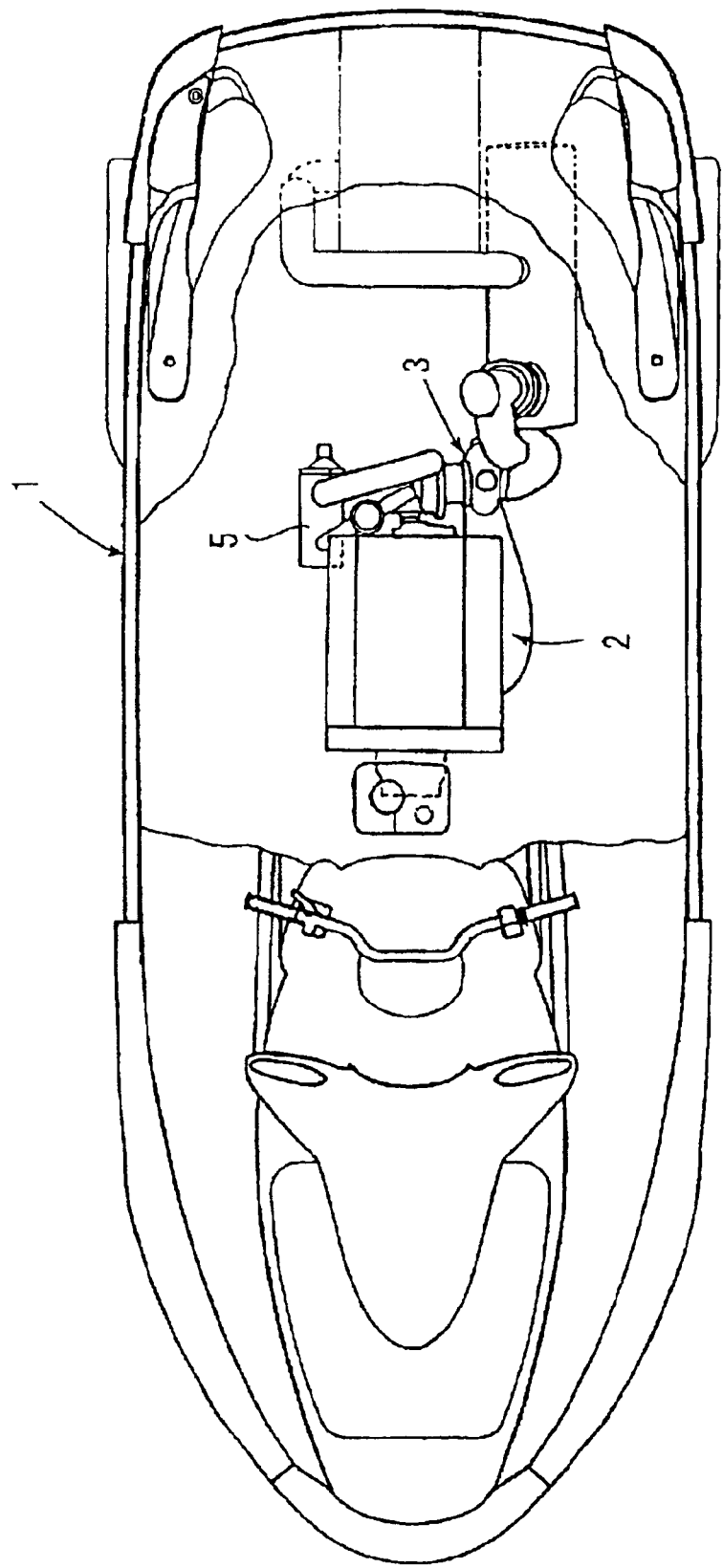
FIG. 9 is an explanatory view of the backgound art.
Figure 10:
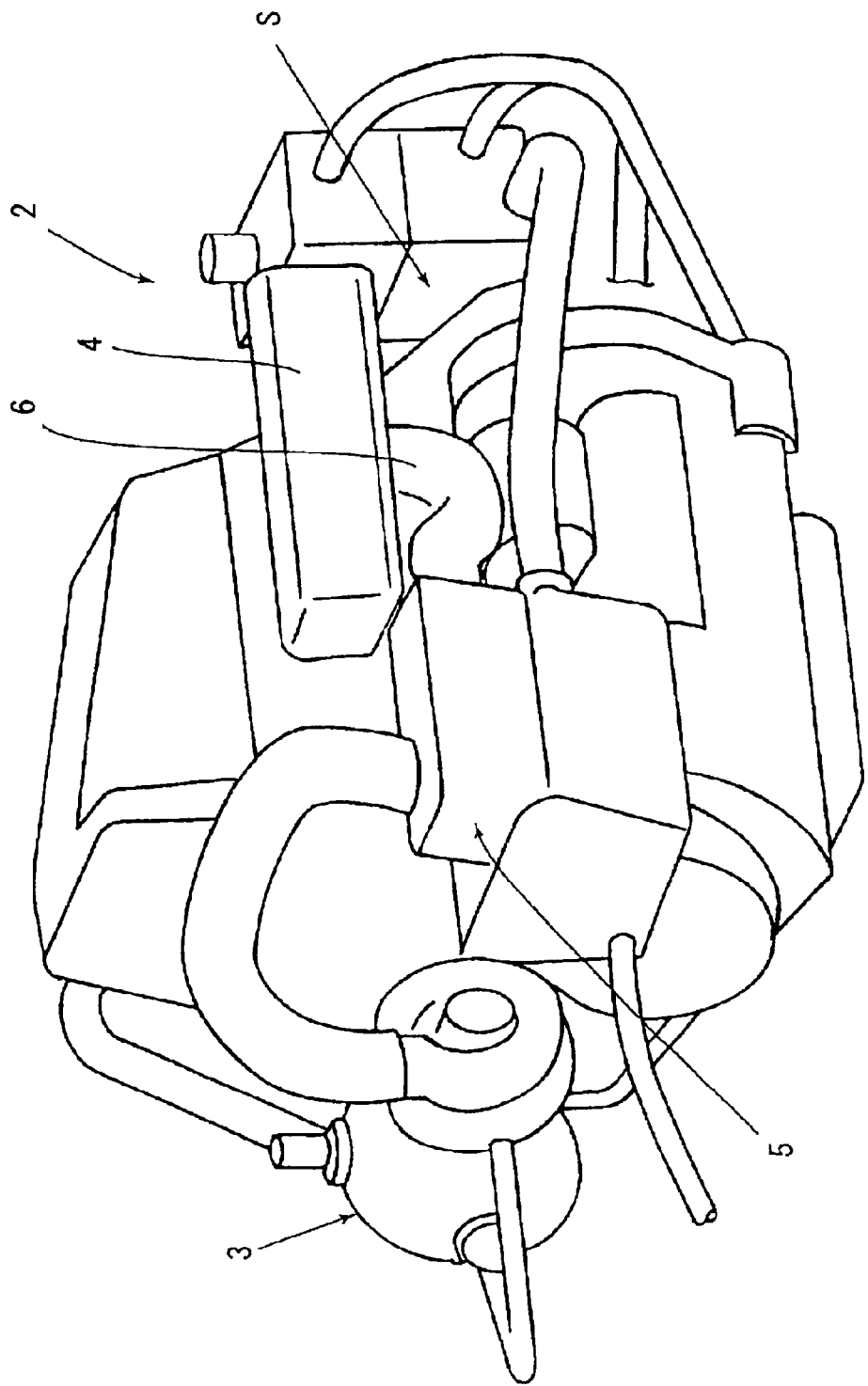
FIG. 10 is an explanatory view of the backgound art.

The first plate 81 is a plate of a substantially inverted U-shape as viewed in side elevation in FIG. 8(c), and has a head portion 81a extending leftwardly and rightwardly, and a pair of leg portions 81b extending downwardly from the opposite ends of the head portion 81a. Each of the leg portions 81b is partly bent rearwardly to form a welding piece 81c to be welded to the second plate 82.

The first plate 81 can be formed by blanking a plate and bending the welding piece 81c.

The second plate 82 is a plate of a substantially rectangular frame shape as viewed in plan as shown in FIG. 8(a).

The second plate 82 has a rectangular frame shaped portion 82a, and a pair of suspending portions 82b, 82b formed to suspend on the inner sides of the left and right (upward and downward portions in FIG. 8(a) of the rectangular frame shaped portion 82a. A lower edge 82c of each of the suspending portions 82b is slightly bent outwardly.

Engaging pieces 82f and 82r for engaging with the isolating plates 66 (refer to FIG. 6(b)) of the cooling unit 60 described hereinabove are formed on the front and the rear (left and right in FIGS. 8(a) and (b)) of the rectangular frame shaped portion 82a.

The second plate 82 can be formed by blanking out a plate and adhering (welding) the suspending portions 82b, the lower edges 82c of the suspending portions 82b, the engaging pieces 82f and 82r and engaging pieces 82d, 82d which are hereinafter described, by bending.

The first plate 81 and the second plate 82 are integrated with each other by adhering (welding) at 84 upper portion inner side faces of the welding pieces 81c of the first plate 81 and outer side faces of the suspending portions 82b of the second plate 82 to each other as shown in FIGS. 8(a) and (b).

The plate 80 has such a basic configuration as described above. In the present embodiment, a net member 85 disposed in the exit 51o described above for preventing passage of foreign matter thereby is provided integrally with the plate.

The net member 85 is made of metal (for example, made of aluminum), and has a frame portion 85a of a substantially rectangular frame shape as viewed in plan as shown in FIG. 8(a). A net portion 85b is formed integrally with the frame portion 85a on the inner side of the frame portion 85a. Two engaging holes 85d, 85d are provided on the front side of the frame portion 85a. One engaging hole 85e is provided on the rear side of the frame portion 85a. The two engaging pieces 82d, 82d are formed integrally on the front portion inner sides of the rectangular frame shaped portion 82a of the second plate 82. Furthermore, a support plate 83 on which an engaging piece 83b for securing the net member 85 is provided at a portion of the second plate 82 in the proximity of the front side of the first plate 81. The support plate 83 is provided integrally with the second plate 82 by welding at 86 suspending portions 83a, 83a at the opposite ends of the support plate 83 to the inner side faces of a swollen portion 82e formed by partly expanding the suspending portions 82b of the second plate 82.

The net member 85 is mounted integrally on the plate 80 by engaging the engaging holes 85d, 85d, and 85e thereof with the engaging pieces 82d of the second plate 82 and the engaging piece 83b of the support plate 83.

The plate 80 having such a configuration as described above is attached to the cooling unit 60 in advance before the cooling unit 60 is assembled into the case 51 in such a manner as described hereinabove. The attachment to the cooling unit 60 is performed by fitting an upper portion of the cooling unit 60 between the suspending portions 82b, 82b of the second plate 82 and engaging the engaging pieces 82f and 82r of the second plate 82 with engaging holes 66f1 and 66r1 (refer to FIG. 7(b)) formed in the isolation plates 66f and 66r (refer to FIG. 6(b)) of the cooling unit 60.

When the cooling unit 60 to which the plate 80 is attached in this manner is assembled in the case 51 in such a manner as described hereinabove (in a state shown in FIGS. 6 and 7), the first plate 81 of the plate 80 cooperates with the cooling unit 60 to isolate the inside of the case 51 into the intake entrance 51i side and the exit 51o except the communicating passage 51d portions.

More specifically, the head portion 81a of the first plate 81 is positioned in the space C described hereinabove to intercept (close up) the undesirable air passage by the space C. The leg portions 81b of the first plate 81 are positioned on the opposite left and right sides of the cooling unit 60 to intercept (close up) the spaces C1, C1 formed between the side plates 67 (L, R) of the cooling unit 60 and inner side walls 51g (refer to FIG. 7(b)) of the case 51.

Furthermore, as shown in FIG. 7(b), the second plate 82 is positioned such that it contacts with upper edges of the side plates 67 (L, R) above the cooling unit 60, and closes the spaces C2 formed between the left and the right of the cooling unit 60 and the inner side walls 51g of the case 51 as viewed in plan.

With such a personal watercraft 10 having an internal combustion engine with a supercharger as described above, the following operation and effects are achieved.

The engine 20 with the supercharger 70 is incorporated in the inside of the body 11 formed from the hull 14 and the deck 15. The surge tank 23 and the intercooler 50 which are in communication with the intake port 21 of the internal combustion engine 20 are provided between the supercharger 70 and the internal combustion engine 20. The intercooler 50 is disposed just below the surge tank 23. Accordingly, the space S1 (refer to FIGS. 4 and 5) below the surge tank 23 can be utilized efficiently. As a result, the small and precious space in the body 11 can be utilized efficiently.

Simultaneously, the intercooler 50 is disposed just below the surge tank 23, the pipe 51c from the intercooler 50 to the surge tank 23 can be formed with a possible minimum length. Accordingly, the temperature rise of intake air while the intake air passes the pipe 51c can be reduced. As a result, the cooling effect of intake air (intake air density) can be augmented to augment the output power of the engine 20.

The intercooler 50 has, at an upper portion thereof, the intake entrance 51i from the supercharger 70 and the exit 51o to the surge tank 23. The intake entrance 51i is provided adjacent the supercharger 70 disposed on one side (in the present embodiment, on the rear side) of the internal combustion engine 20, while the exit 51o is provided adjacent the other side of the internal combustion engine 20. Accordingly, the supercharger 70, intercooler 50 and surge tank 23 can be connected to each other by short pipes (pipes 72 and 51c).

In addition, the intake entrance 51i of the intercooler 50 and the supercharger 70 can be connected to each other making use of the connection space (space formed between the surge tank 23 and the intercooler 50 below the surge tank 23) S2 (refer to FIGS. 4 and 5) between the exit 51o of the intercooler 50 and the surge tank 23 positioned just above the intercooler 50. Accordingly, the small and precious space in the body 11 can be utilized further efficiently.

The personal watercraft includes the water-cooled intercooler 50 disposed in the intake system of the internal combustion engine 20 and the cooling water passage 91 for taking in cooling water W to be supplied to the intercooler 50 from the outside of the personal watercraft 10 and supplying the cooling water W to the intercooler 50. Accordingly, with the personal watercraft 10 having the internal combustion engine 20 with the supercharger 70 incorporated therein, the intercooler 50 is cooled with water (seawater or the like) of a low temperature taken in from the outside of the personal watercraft. Accordingly, the necessity for any other heat exchanger for cooling the intercooler 50 is eliminated.

Since the cooling water passage 91 communicates the jet pump 30 for propelling the personal watercraft and the intercooler 50 with each other, supply of cooling water to the intercooler 50 is performed from the jet pump 30 through the cooling water passage 91. Accordingly, the necessity for any other pump for supplying cooling water to the intercooler 50 is eliminated.

Since the cooling water passage 91 communicates the jet pump 30 for propelling the personal watercraft and the intercooler 50 directly with each other, the intercooler 50 is cooled directly (without any other cooled member (for example, the internal combustion engine 20 or the turbocharger 70) with cooling water from the jet pump 30. Accordingly, the density of intake air is further augmented and the output power of the internal combustion engine 20 is further augmented.

Since cooling water is supplied from the intake entrance 51*i* side into the intercooler 50, the intake entrance 51*i* side at which the temperature is higher in the intercooler 50 is cooled efficiently. Accordingly, the cooling effect of intake air by the entire intercooler 50 is further augmented and the output power of the internal combustion engine 20 is further augmented.

Furthermore, with the intercooler 50 in the present embodiment, the following operation and effects are obtained.

The plate 80 which closes the spaces between the outer peripheral edges of the heat exchanging fins 61 and the inner wall faces 51*e* and 51*g* partially (in this instance, the spaces C, C1 and C2) and forms an air flow passage at a location (in this instance, the original air passage described hereinabove) other than the closed portions is provided as a separate member from the case 51. Therefore, air entering from the intake entrance 51*i* goes out from the exit 51*o* after it contacts with the heat exchanging fins 61. Accordingly, with the intercooler 50 in the present embodiment, the heat exchanger effectiveness and the cooling effect for intake air are further augmented.

Furthermore, if blowing back of intake air (so-called back fire) from the combustion chamber of the internal combustion engine 20 occurs, with a conventional intercooler, a spark arrester for the exclusive use or the like is required because there is the possibility that part of back fire entering from the exit may go out to the supercharger 70 side through the intake entrance through the space C described above and so forth almost without contacting with the heat exchanging fins. However, with the intercooler 50 in the present embodiment, the situation that back fire directly goes to the intake entrance 51*i* through the space C from the exit 51*o* of the intercooler 50 is eliminated. In addition, the back fire contacts with and is cooled by the heat exchanging fins 61 and is extinguished. Consequently, the necessity for provision of a spark arrester for the exclusive use or the like is eliminated.

Furthermore, since the plate 80 is formed as a separate member from the case, the space between the outer peripheral edges of the heat exchanging fins 61 and the inner wall face of the case can be closed with a simple structure. This is described in detail below.

The case 51 is formed as a two-piece (in this instance, the front case 51*f* and the rear case 51*r*) member in order to accommodate the cooling unit 60 therein. In order to facilitate the accommodation of the cooling unit 60 and further to assure a good parting performance upon molding of the case, the cases 51*f* and 51*r* are tapered at least at the inner wall faces (51*e* and 51*g*) thereof.

In addition, the cooling unit 60 has such a basic configuration (major component) that a large number of heat exchanging fins 61 are disposed in layers and the water pipes 62 extend through the heat exchanging fins 61. The large number of heat exchanging fins 61 preferably have the same shape in order to facilitate manufacture. Accordingly, it is very difficult to provide such a taper as extends along the inner face of the case 51 to the outer shape of the entire heat exchanging fins 61. As a result, the outer shape of the heat exchanging fins 61 is restricted to a parallelepiped.

Therefore, a space is formed around the cooling unit 60 from the inner wall face of the case 51. Conventionally, there is a problem that air from the intake entrance 51*i* leaks to the exit 51*o* through the undesirable space (as it were, a shortcut state is established).

It is difficult to solve such a problem as just described by changing the shape of the cooling unit 60 or by changing the inner shape of the case 51 from the reason described above, and this gives rise to a problem in that the heat exchanger effectiveness by the intercooler 50 is degraded.

In contrast, with the intercooler 50 in the present embodiment, the problem described can be solved by incorporating the plate 80 separate from the case 51 into the case 51 as described above to close the space with a simple structure.

Since the plate 80 is made of aluminum, the heat of intake air or backfire which contacts with the plate 80 is decreased efficiently.

The intake entrance 51*i* and the exit 51*o* are formed on the same side (in the present embodiment, the upper side) of the case 51 and the plate 80 closes the space between the inner wall face (51*e* and 51*g*) on the side (in the present embodiment, the upper side) of the case 51 on which the intake entrance 51*i* and the exit 51*o* are formed and the outer peripheral edges of the heat exchanging fins 61 between the intake entrance 51*i* and the exit 51*o*. Accordingly, the plate 80 can be formed in a small size and the intercooler 50 itself can be formed in a small size.

A plurality of heat exchanging fins 61 are layered at a predetermined pitch and the plate 80 partly closes the space between the outer peripheral edge 61*a* of at least one of the heat exchanging fins and the inner wall face of the case. Accordingly, the pitch (layer distance) of the heat exchanging fins 61 which is effective for the cooling efficiency and flame-out of back fire and the mounted position of the plate 80 (particularly the first plate 81 of the plate 80) can be selected freely.

The net member 85 for preventing passage of foreign articles is provided at the exit 51*o*. Accordingly, even if the supercharger 70 or the heat exchanging fins 61 are deteriorated and part of the same is exfoliated (or drops), such foreign articles (or an exfoliated object, a dropping object or the like) is caught by the net member 85 and is prevented from coming into the intake port 21 of the internal combustion engine 20.

Particularly where the intercooler 50 is used in the personal watercraft 10 as in the present embodiment, the supercharger 70 or the heat exchanging fins 61 are liable to be deteriorated by water or salt included in the intake air. Accordingly, the intercooler 50 described above is particularly effective where it is used for a personal watercraft.

The net member 85 is provided integrally with the plate 80, attachment of the net member 85 is performed simultaneously with assembly of the plate 80. Accordingly, the labor for attaching the net member 85 separately is eliminated.

While an embodiment of the present invention is described above, the present invention is not limited to the embodiment described above but can be carried out suitably in various forms within the scope of the subject matter of the present invention.

For example, the shapes of the plate 80 and the net member 85 can be changed suitably in accordance with the internal shape of the intercooler 50, the shape of the heat exchanging fins 61 and so forth.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A personal watercraft, comprising:
   a body, said body including a hull and a deck;
   an internal combustion engine incorporated in said body, said internal combustion engine including a supercharger incorporated therein; and
   a surge tank and an intercooler provided between said supercharger and said internal combustion engine, said surge tank and said intercooler being in communication with an intake port of said internal combustion engine,
   wherein said intercooler is disposed just below said surge tank.

2. The personal watercraft according to claim 1, wherein said intercooler includes an intake entrance from said supercharger and an exit to said surge tank at an upper portion thereof, and said intake entrance is provided adjacent said supercharger disposed on one side of said internal combustion engine while said exit is provided adjacent the other end of said internal combustion engine.

3. A personal watercraft, comprising:
   an internal combustion engine, said internal combustion engine including a supercharger incorporated therein;
   a water cooled intercooler, said intercooler being disposed in an intake system of said internal combustion engine; and
   a cooling water passage for taking in cooling water to be supplied to said intercooler from an outside of said personal watercraft and supplying the cooling water to said intercooler,
   wherein said cooling water passage communicates a jet pump for propelling said personal watercraft and said intercooler directly with each other.

4. The personal watercraft according to claim 3, wherein said intercooler includes an intake entrance from said supercharger and an exit to a surge tank, and the cooling water is supplied from the intake entrance side into said intercooler.

5. A personal watercraft, comprising:
   an internal combustion engine, said internal combustion engine including a supercharger incorporated therein;
   a water cooled intercooler, said intercooler being disposed in an intake system of said internal combustion engine; and
   a cooling water passage for taking in cooling water to be supplied to said intercooler from an outside of said personal watercraft and supplying the cooling water to said intercooler,
   wherein said cooling water passage communicates a jet pump for propelling said personal watercraft and said intercooler directly with each other, and
   wherein said intercooler includes an intake entrance from said supercharger and an exit to a surge tank, and the cooling water is supplied from the intake entrance side into said intercooler.

6. A personal watercraft, comprising:
   an internal combustion engine, said internal combustion engine including a supercharger incorporated therein;
   a water cooled intercooler, said intercooler being disposed in an intake system of said internal combustion engine; and
   a cooling water passage for taking in cooling water to be supplied to said intercooler from an outside of said personal watercraft and supplying the cooling water to said intercooler,
   wherein said intercooler includes an intake entrance from said supercharger and an exit to a surge tank, and the cooling water is supplied from the intake entrance side into said intercooler.

7. A personal watercraft, comprising:
   an internal combustion engine, said internal combustion engine including a supercharger incorporated therein;
   a water cooled intercooler, said intercooler being disposed in an intake system of said internal combustion engine; and
   a cooling water passage for taking in cooling water to be supplied to said intercooler from an outside of said personal watercraft and supplying the cooling water to said intercooler,
   wherein said cooling water passage communicates a jet pump for propelling said personal watercraft and said intercooler with each other, and
   wherein said intercooler includes an intake entrance from said supercharger and an exit to a surge tank, and the cooling water is supplied from the intake entrance side into said intercooler.

8. A vessel, comprising:
   a body, said body including a hull and a deck;
   an internal combustion engine incorporated in said body, said internal combustion engine including a supercharger incorporated therein; and
   a surge tank and an intercooler provided between said supercharger and said internal combustion engine, said surge tank and said intercooler being in communication with an intake port of said internal combustion engine,
   wherein said intercooler is disposed just below said surge tank.

9. The vessel according to claim 8, wherein said intercooler includes an intake entrance from said supercharger and an exit to said surge tank at an upper portion thereof, and said intake entrance is provided adjacent said supercharger disposed on one side of said internal combustion engine while said exit is provided adjacent the other end of said internal combustion engine.

10. A vessel, comprising:
    an internal combustion engine, said internal combustion engine including a supercharger incorporated therein;
    a water cooled intercooler, said intercooler being disposed in an intake system of said internal combustion engine; and
    a cooling water passage for taking in cooling water to be supplied to said intercooler from an outside of said vessel and supplying the cooling water to said intercooler,
    wherein said cooling water passage communicates a jet pump for propelling said vessel and said intercooler directly with each other.

11. The vessel according to claim 10, wherein said intercooler includes an intake entrance from said supercharger and an exit to a surge tank, and the cooling water is supplied from the intake entrance side into said intercooler.

12. A vessel, comprising:

an internal combustion engine, said internal combustion engine including a supercharger incorporated therein;

a water cooled intercooler, said intercooler being disposed in an intake system of said internal combustion engine; and a cooling water passage for taking in cooling water to be supplied to said intercooler from an outside of said vessel and supplying the cooling water to said intercooler, wherein said cooling water passage communicates a jet pump for propelling said vessel and said intercooler directly with each other, and wherein said intercooler includes an intake entrance from said supercharger and an exit to a surge tank, and the cooling water is supplied from the intake entrance side into said intercooler.

13. A vessel, comprising:

an internal combustion engine, said internal combustion engine including a supercharger incorporated therein;

a water cooled intercooler, said intercooler being disposed in an intake system of said internal combustion engine; and a cooling water passage for taking in cooling water to be supplied to said intercooler from an outside of said vessel and supplying the cooling water to said intercooler, wherein said intercooler includes an intake entrance from said supercharger and an exit to a surge tank, and the cooling water is supplied from the intake entrance side into said intercooler.

14. A vessel, comprising:

an internal combustion engine, said internal combustion engine including a supercharger incorporated therein;

a water cooled intercooler, said intercooler being disposed in an intake system of said internal combustion engine; and a cooling water passage for taking in cooling water to be supplied to said intercooler from an outside of said vessel and supplying the cooling water to said intercooler, wherein said cooling water passage communicates a jet pump for propelling said vessel and said intercooler with each other, and wherein said intercooler includes an intake entrance from said supercharger and an exit to a surge tank, and the cooling water is supplied from the intake entrance side into said intercooler.

* * * * *